(12) United States Patent
Herratti et al.

(10) Patent No.: US 7,856,442 B2
(45) Date of Patent: Dec. 21, 2010

(54) METHOD AND SYSTEM FOR COMMUNICATING LOCAL CONTENT OVER A NETWORK

(75) Inventors: Jay Herratti, Los Angeles, CA (US); Robert D. Rhoden, Culver City, CA (US); Robert James Angel, Squamish (CA); Aaron Louis Bush, Culver City, CA (US)

(73) Assignee: Ticketmaster, a Delaware Co.,, West Hollywood, CA (US)

( * ) Notice: Subject to any disclaimer, the term of this patent is extended or adjusted under 35 U.S.C. 154(b) by 387 days.

(21) Appl. No.: 12/059,278

(22) Filed: Mar. 31, 2008

(65) Prior Publication Data

US 2009/0248630 A1  Oct. 1, 2009

(51) Int. Cl.
*G06F 17/30* (2006.01)
(52) U.S. Cl. .................................... 707/758; 707/826
(58) Field of Classification Search ................. 707/758, 707/826
See application file for complete search history.

(56) References Cited

U.S. PATENT DOCUMENTS

| | | | |
|---|---|---|---|
| 2004/0153367 A1* | 8/2004 | Lapstun et al. ............... | 705/14 |
| 2004/0249709 A1* | 12/2004 | Donovan et al. ............... | 705/14 |
| 2005/0027594 A1* | 2/2005 | Yasnovsky et al. ............ | 705/14 |
| 2007/0214044 A1* | 9/2007 | Lee .............................. | 705/14 |
| 2007/0226053 A1* | 9/2007 | Carl et al. ..................... | 705/14 |

* cited by examiner

*Primary Examiner*—Neveen Abel-Jalil
*Assistant Examiner*—Son T Hoang
(74) *Attorney, Agent, or Firm*—Stephen M. De Kierk; SNR Denton US LLP

(57) ABSTRACT

A communications system for communicating local content over a network includes storing a plurality of primary local content entries on a local content provider computer system, storing an account total for each of a plurality of customers, storing a plurality of added local content entries relating to the customers on a local content provider computer system, transmitting at least a subset of the matched entries from the local content provider computer system over a network to a partner computer system, each matched entry that is transmitted including data from a respective one of the primary local content entries, and depending upon the account total of each customer corresponding to each entry, added content from the respective added local content entry and updating a selected account total of a selected customer for a charge based on a transaction at the partner computer system, the transaction involving extraction and transmission of a selected entry corresponding to the selected customer due to a search request being received from a remote computer system at the partner computer system.

13 Claims, 16 Drawing Sheets

METHOD AND SYSTEM FOR COMMUNICATING LOCAL CONTENT OVER A NETWORK

BACKGROUND OF THE INVENTION

1). Field of the Invention

This invention relates to a communications system for communicating local content over a network.

2). Discussion of Related Art

The Internet is often used to obtain local content information regarding businesses in a specific geographic area. A user interface is typically stored on a server computer system and transmitted over the Internet to a client computer system. The user interface typically has a search box for entering text. A user can then select a search button to transmit a search request from a remote computer system to a server computer system. The server computer system then compares the text with data in a database or data source, and extracts local content information based on the text from the database or data source. The local content information is then transmitted from the server computer system to the remote computer system for display at the client computer system.

SUMMARY OF THE INVENTION

The invention provides a method of communicating local content over a network, including storing a plurality of primary local content entries on a local content provider computer system, storing an account total for each of a plurality of customers, storing a plurality of added local content entries relating to the customers on a local content provider computer system, transmitting at least a subset of the matched entries from the local content provider computer system over a network to a partner computer system, each matched entry that is transmitted including data from a respective one of the primary local content entries, and depending upon the account total of each customer corresponding to each entry, added content from the respective added local content entry and updating a selected account total of a selected customer for a charge based on a transaction at the partner computer system, the transaction involving extraction and transmission of a selected entry corresponding to the selected customer due to a search request being received from a remote computer system at the partner computer system.

The method may further include matching each added local content entry to a respective one of the primary local content entries, and adding the added content to the primary local content entry if the account total is above a predetermined amount, to create the matched entries.

The method may further include storing the entries in a partner data store at the partner computer system, receiving a search request from the remote computer system at the partner computer system, extracting the selected entry from the partner data store based on the search request, and transmitting the selected entry from the partner computer system to the remote computer system.

The method may further include reporting the transaction by automatically transmitting a transaction report from the partner computer system to the local content provider system.

The account total may be automatically updated in response to the transaction report.

The entries that may be transmitted from the local content provider computer system to the partner computer system may depend upon the account total of each customer, because each entry may include an indicator that depends on the account total.

The indicator may be a first indicator if the account total is above a predetermined amount, and a second indicator if the account total is below the predetermined amount.

A plurality of the entries may be extracted from the partner data store and may further include transmitting a results page from the partner computer system to the remote computer system, the results page including a plurality of entry selectors corresponding to the entries that are extracted, receiving a selection from the remote computer system at the partner computer system following selection of one of the entry selectors at the remote computer system, and transmitting the entry corresponding to the entry selector selected at the remote computer system to the remote computer system.

Each entry may include at least a name, an address, a telephone number, and a geographical location.

The method may further include receiving contents for the entries from a plurality of customer computer systems.

The method may further include receiving an update of each account total from the customer computer systems upon payment.

The method may further include receiving enrollment information from each customer computer system prior to receiving the contents for each entry.

The method may further include generating the geographic location of each entry, utilizing the contents received from each respective customer computer system.

The invention further provides a computer-readable medium having stored thereon a set of instructions which, when executed by a processor of a computer, carries out a method including storing an account total for each of a plurality of customers, storing a plurality of local content entries relating to the customers on a local content provider computer system, transmitting at least a subset of the entries from the local content provider computer system over a network to a partner computer system, the entries that are transmitted depending upon the account total of each customer corresponding to each entry, and updating a selected account total of a selected customer for a charge based on a transaction at the partner computer system, the transaction involving extraction and transmission of a selected entry corresponding to the selected customer due to a search request received from a remote computer system at the partner computer system.

The invention further provides a communications system for communicating local content over a network, including a local content provider computer system, including at least one local content provider data store, an account total stored in the at least one local content provider data store for each of a plurality of customers, a plurality of local content entries, stored in the at least one local content provider data store for each one of the customers, a data-forwarding module for transmitting at least a subset of the entries from the local content provider computer system over a network to a partner computer system, the entries that are transmitted depending upon the account total of each customer corresponding to each entry, and an account reduction module that updates the total of a selected customer for a charge based on a transaction at the partner computer system, the transaction involving extraction and transmission of a selected entry corresponding to the elected customer due to a search request received from a remote computer system at the partner computer system.

The communications system may further include a reporting module on the partner computer system that reports the transaction by automatically transmitting a transaction report from the partner computer system to the local content provider system.

BRIEF DESCRIPTION OF THE DRAWINGS

The invention is further described by way of example with reference to the accompanying drawings, wherein:

FIG. 5 is a view that is displayed at the customer computer system for submitting added content;

FIG. 8A is a view that is displayed at the customer computer system so that a customer can make a payment;

FIG. 11 is a view of a results page that is displayed at the remote computer system;

FIG. 12 is a view that is displayed at the remote computer system of a local content entry.

DETAILED DESCRIPTION OF THE INVENTION

Figure 1:
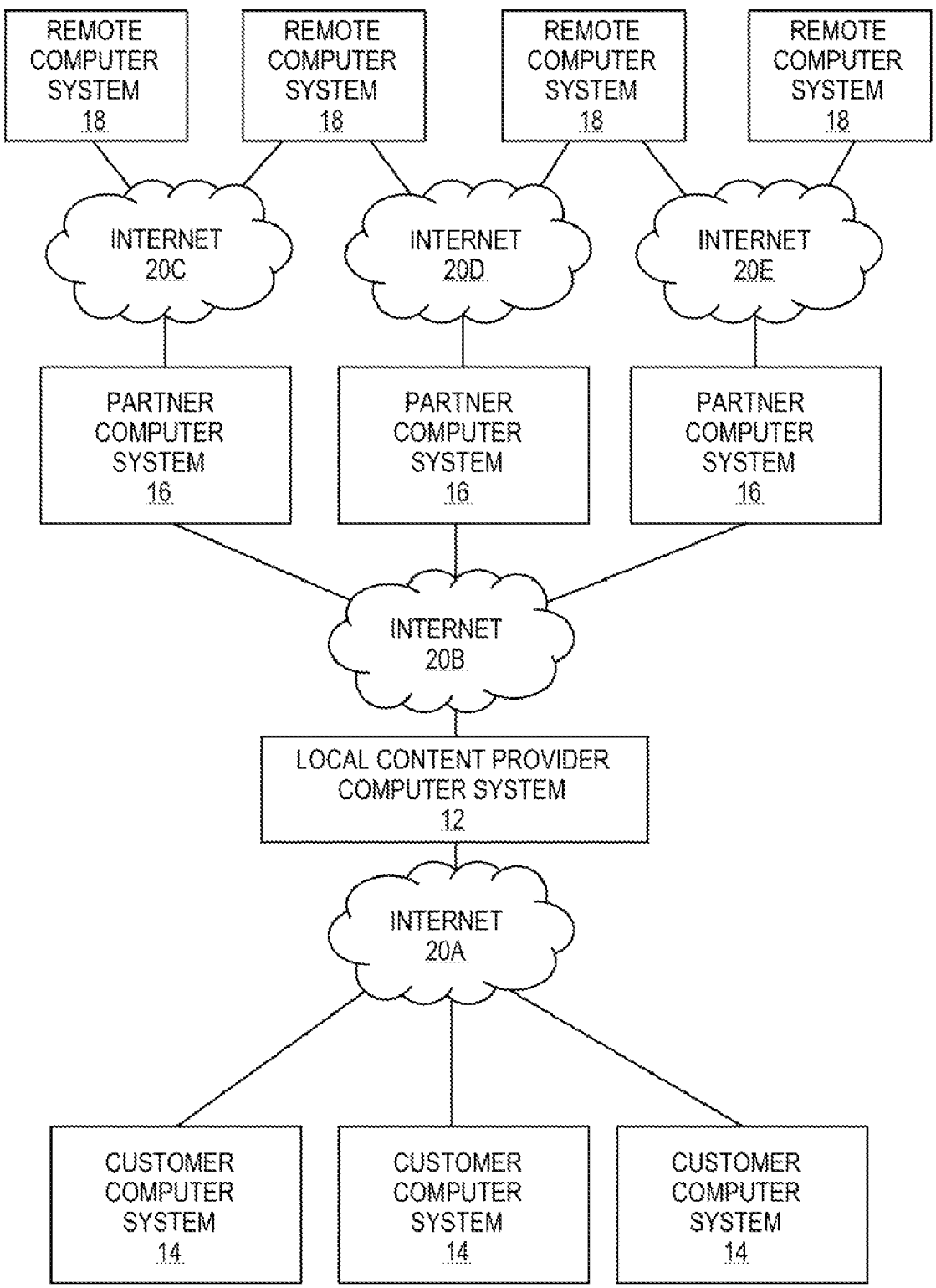
FIG. 1 is a block diagram of a communications system for communicating local content, according to an embodiment of the invention.

FIG. 1 of the accompanying drawings illustrates a communications system 10, according to an embodiment of the invention, including a local content provider computer system 12, a plurality of customer computer systems 14, a plurality of partner computer systems 16, a plurality of remote computer systems 18, and a network in the form of the Internet 20A, 20B, 20C, 20D, and 20E. The Internet 20A, 20B, 20C, 20D, and 20E is shown in separate parts to illustrate flow of signals and data, although it should be understood that the Internet is a single network.

The customer computer systems 14 are connected over the Internet 20A to the local content provider computer system 12. The local content provider computer system 12 holds databases with account data and data of business of customers. A customer at each one of the customer computer systems 14 can access the local content provider computer system 12. The customer can enroll by creating an account on the local content provider computer system 12, and store associated content such as business content on the local content provider computer system 12.

The partner computer systems 16 are connected over the Internet 20B to the local content provider computer system 12. Local content and account information can be transmitted from the local computer provider computer system 12 over the Internet 20B to the partner computer system 16 as needed.

Some of the remote computer systems 18 are connected over the Internet 20C to one of the partner computer systems 16, while some of the remote computer systems 18 are connected over the Internet 20D to another one of the partner computer systems 16, and some of the remote computer systems 18 are connected over the Internet 20E to a further one of the partner computer systems 16. The local content received by one of the partner computer systems 16 can be transmitted over, for example, the Internet 20E to one of the remote computer systems 18 as required. Any transactions between one of the partner computer systems 16 and a remote computer system 18 can be reported to the local content provider computer system 12 by transmitting a transaction report from the partner computer system 16 over the Internet 20B to the local content provider computer system 12.

Figure 2:
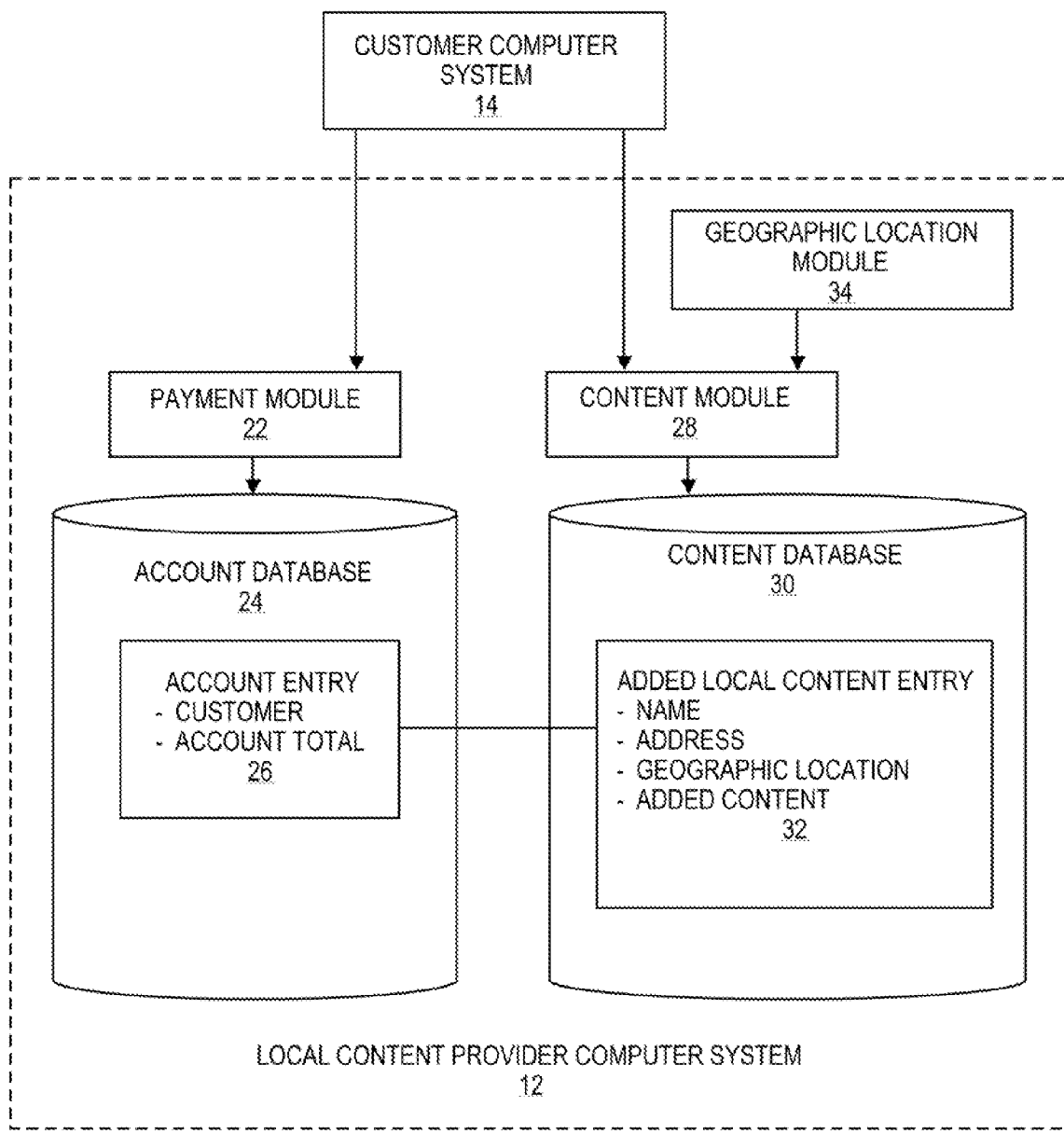
FIG. 2 is a block diagram of a customer computer system and a local content provider computer system of the communications system.

As shown in FIG. 2, the local content provider computer system 12 includes a payment module 22, an account data store in the form of an account database 24, a plurality of account entries 26 (one of which is shown) stored in the account database, a content module 28, a content data store in the form of a content database 30, a plurality of added local content entries 32 (one of which is shown) stored in the content database 30, and a geographic location module 34. A customer computer system 14 connects through the payment module 22 to the account database 24. The content module 28 is connected to and receives input from the customer computer system 14 and the geographic location module 34. The content module 28 is connected to the content database 30.

Each account entry 26 includes at least a customer and an account total. The customer may be identified by name, customer number, etc. Each one of the added local content entries 32 includes a name, typically a business name, an address, a geographic location, and added content. Each one of the added local content entries 32 is associated with one of the account entries 26.

Figure 3:
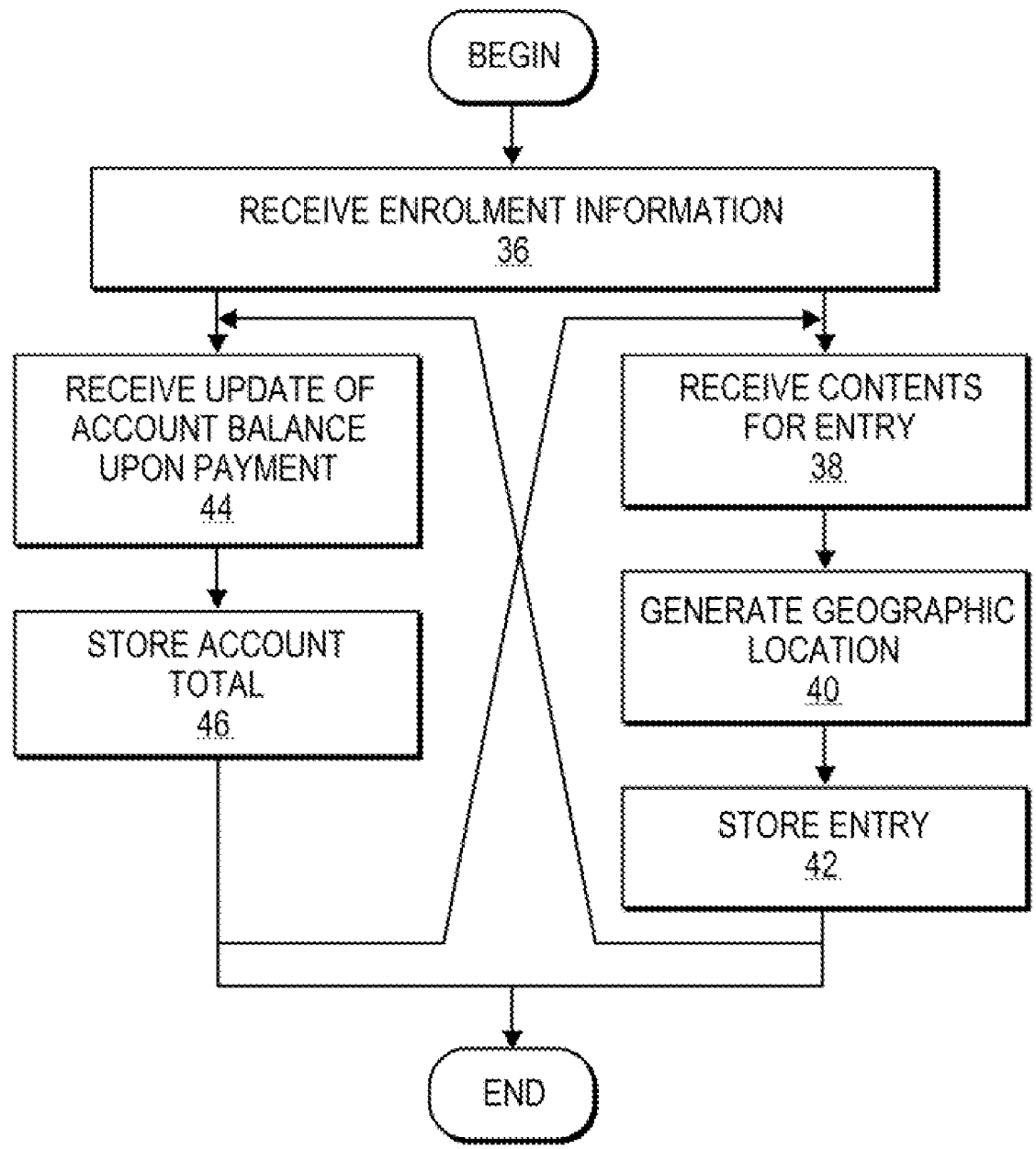
FIG. 3 is a flow chart, illustrating the functioning of the components in FIG. 2.

The functioning of FIG. 2 is now described with reference to FIG. 3. A customer at the customer computer system 14 operates the customer computer system 14 to transmit a signal to the local content provider system 12, wherein the signal includes a request for an enrollment page. The local content provider computer system 12 then automatically transmits a signal to the customer computer system 14 that includes the enrollment page. The customer at the customer computer system 14 can then complete the enrollment page with enrollment information, and then cause the transmission of a signal from the customer computer system 14 to the local content provider computer system 12, the signal including the enrollment information. At Block 36, the enrollment information is received by the local content provider computer system 12.

For purposes of further discussion, the contents of each signal, the transmission of the signal, and the reception of the signal is not described in detail. The contents of each signal should, however, be evident to one of ordinary skill in the art, and one of ordinary skill in the art will also appreciate that each signal is transmitted, sometimes automatically, from one computer system to another computer system as hereinbefore described with respect to enrollment.

At Block 38, the local content provider computer system 12 receives the content of an added local content entry 32. The contents of the added local content entry 32 are received when the customer at the customer computer system 14 accesses the content module 28 and uploads the contents of the added local content entry 32, utilizing the content module 28. The contents of the added local content entry 32 that are uploaded by the customer at the customer computer system 14 include the name, typically a business name, address, and added content of the added local content entry 32.

At Block 40, a geographic location is generated for the added local content entry 32. The content module 28 communicates the address of the added local content entry 32 to the geographic location module 34, and the geographic location module 34 provides the geographic location corresponding to the address to the content module 28. The geographic location typically includes longitude and latitude. The geographic location is then associated and forms part of the added local content entry 32. At Block 42, the added local content entry 32 is stored in the content database 30 of the local content provider computer system 12.

At Block 44, the local content provider computer system 12 receives an update of an account balance upon payment. The customer at the customer computer system 14 accesses the payment module 22, and utilizes the payment module 22 to submit a payment. Upon completion of the payment, the account total of the account entry 26 corresponding to the customer is increased by an amount that equals the payment. The final account balance is thus equal to the amount reflected in the account entry 26 before completion of the payment, plus the amount of the payment. At Block 46, the account total of the account entry 26 is updated and stored in the account database 24.

Figure 4:
FIG. 4 is a view of a page that is used at the customer computer system for enrolling.

FIG. 4 illustrates a view that is included in the signal that is transmitted to the customer computer system 14 upon enrollment. The view of FIG. 4 includes fields that can be completed by the customer, and a button ("Continue") can be selected by the customer to transmit the information entered into the fields in the view of FIG. 4 back to the local content provider computer system 12 (Block 36 in FIG. 3). The view of FIG. 4 is generated within a browser such as Internet Explorer®, Firefox®, or Netscape®. A browser includes a surrounding viewing pane, a field for entering a Uniform Resources Locator (URL) of a remote computer, and numerous buttons and selectors, for example, "forward," "back," "refresh," "enter," etc.

Figure 5:
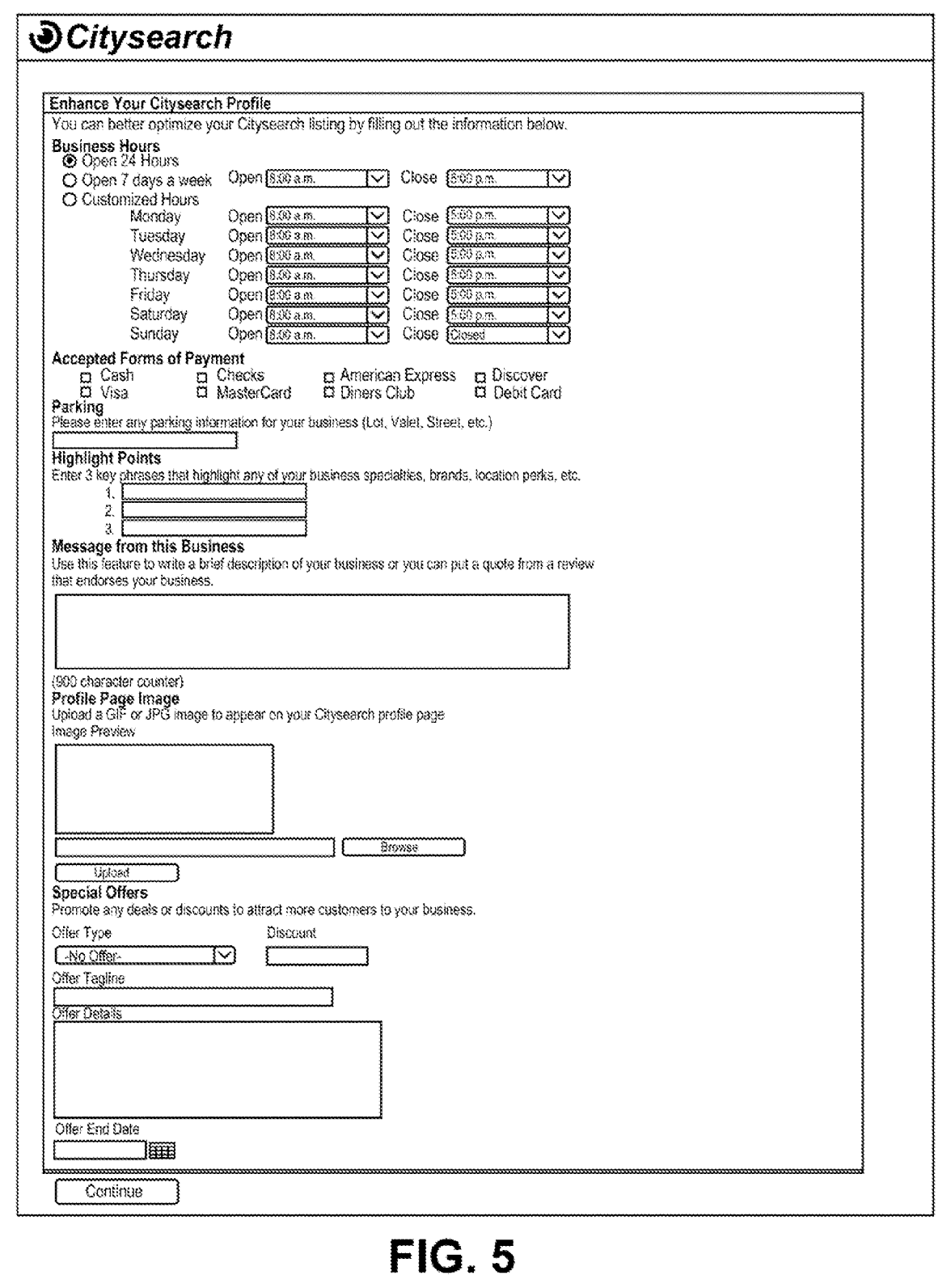
Figure 6:
FIG. 6 is a view that is displayed at the customer computer system for editing content.

FIG. 5 is a view that is displayed at the customer computer system 14 to create the contents as hereinbefore described with reference to Block 38 in FIG. 3. The customer can enter the required information in the editable fields, and then select a button ("Continue") to transmit the entered information to the local content provider computer system 12. FIG. 6 is a view that is displayed at the customer computer system 14 when the customer decides to edit or change any of the information of the added local content entry 32 stored in the content database 30.

Figure 7:
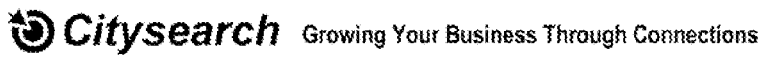
FIG. 7 is a view that is displayed at the customer computer system for submitting payment.
Figure 8:
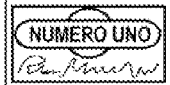
FIG. 8 is a view that is displayed at the customer computer system to confirm payment.
Figure 8A:
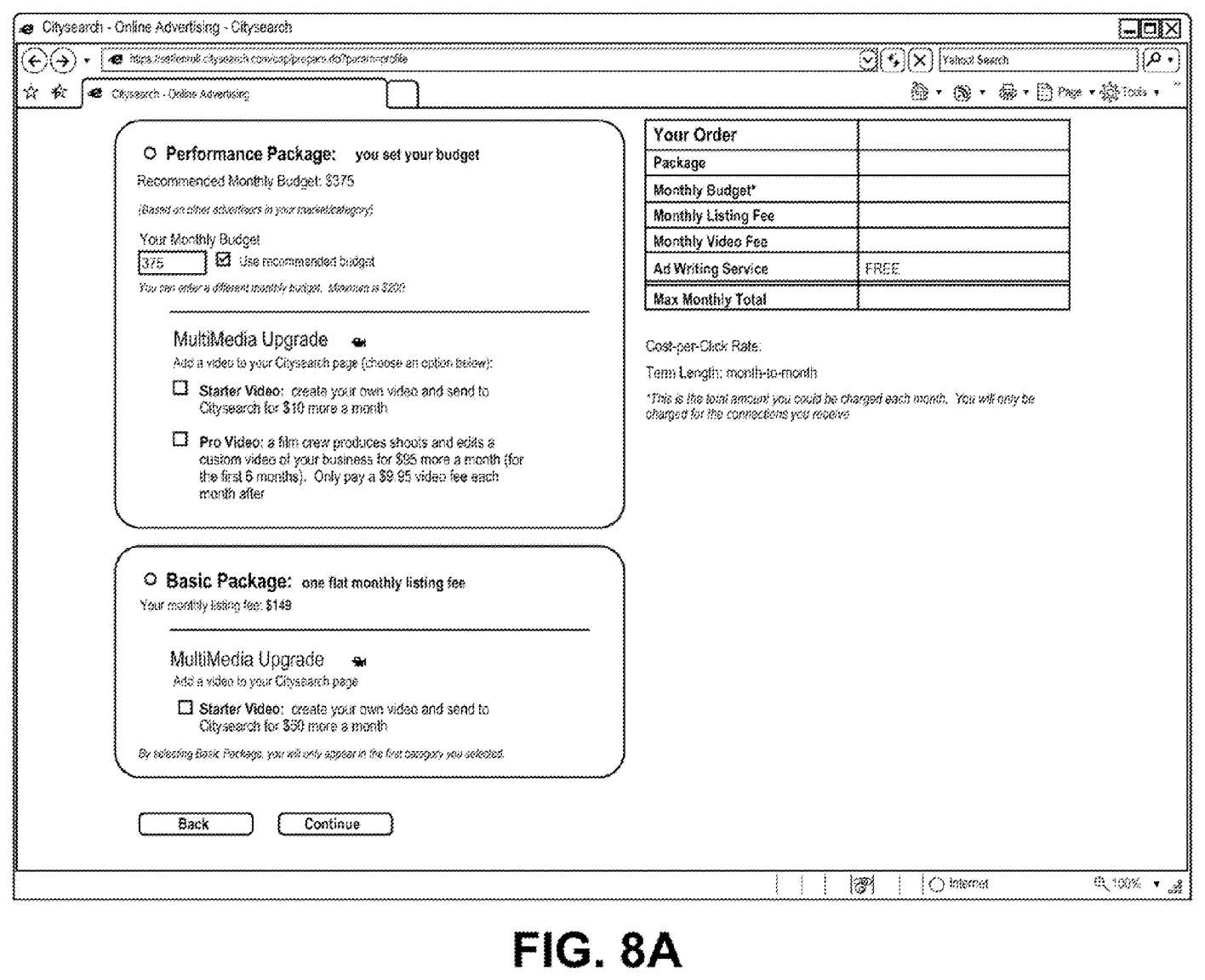

FIG. 7 illustrates a view that is transmitted to the customer computer system 14 for purposes of receiving payment. The view of FIG. 7 includes, for example, selection of a credit card type, the name on the card, the credit card number, and the expiration date on the credit card. The view of FIG. 7 also includes a button ("Submit Order") that results in completion of the order. FIG. 8 illustrates a view that is transmitted to the customer computer system 14 to confirm completion of the order. FIG. 8A illustrates how a customer can make a payment so that their account is updated.

Figure 9A:
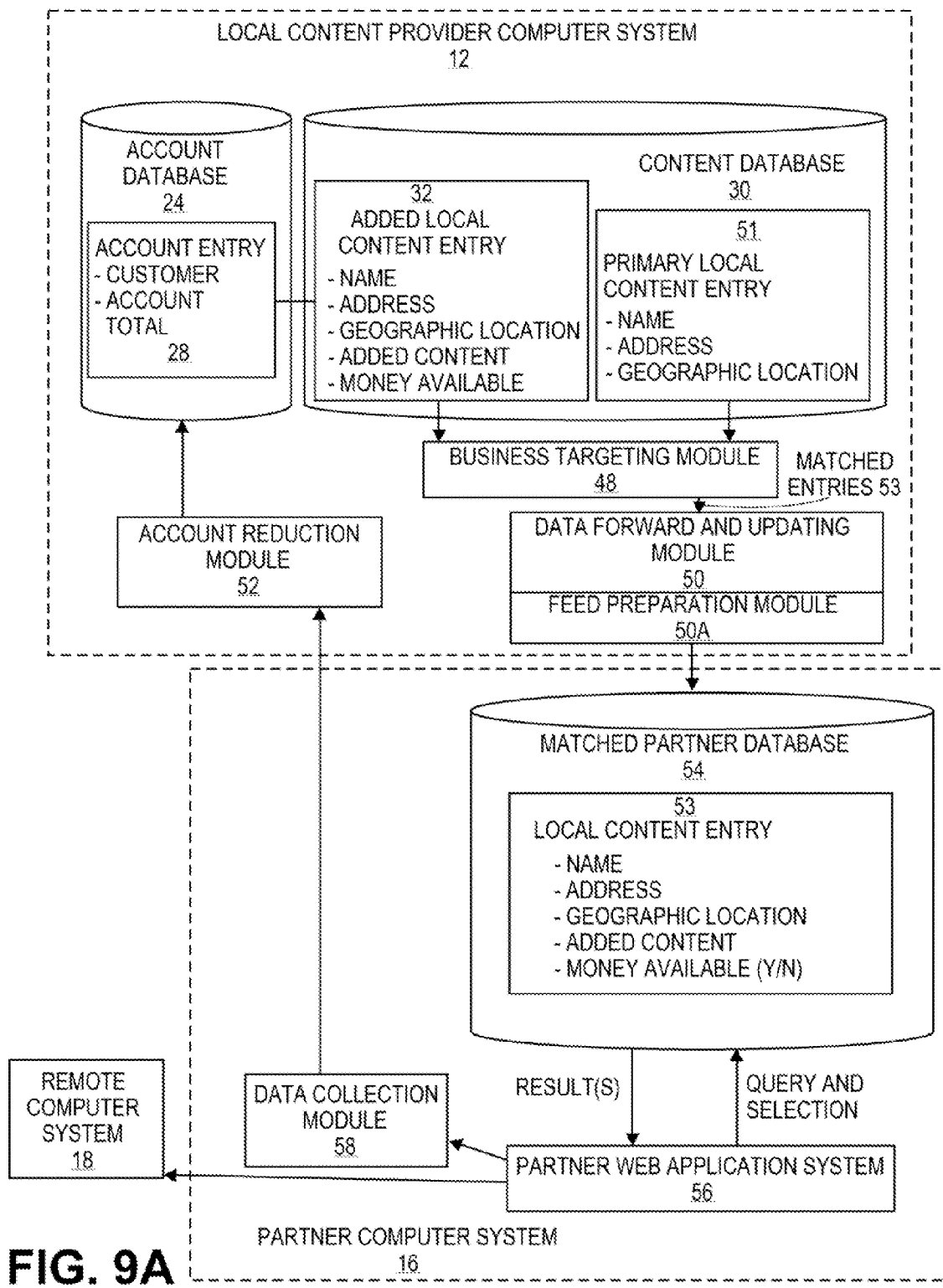
FIGS. 9A, 9B, and 9C are block diagrams of the local content provider computer system, a partner computer system, and a remote computer system.

FIG. 9A illustrates further components of the local content provider computer system 12, including a business data targeting module 48, a data forwarding and updating module 50 and an account reduction module 52, and further components of the partner computer system 16, including a partner data store in the form of a partner database 54, a partner Web application system 56, and a data collection module 58.

The business targeting module 48 is connected to the content database 30. The data forwarding and updating module 50 is connected to the business targeting module 48. The account reduction module 52 is connected to the account database 24.

The partner database 54 is connected to a feed preparation module 50A of the data forwarding and updating module 50. The partner Web application system 56 is connected to the partner database 54. The data collection module 58 connects the partner Web application system 56 to the account reduction module 52. The partner Web application system 56 is connected to the remote computer system 18 to receive signals from the remote computer system 18.

The content database includes a plurality of added local content entries 32 as hereinbefore described, and also includes a plurality of primary local content entries 51. Each one of the added local content entries 32 can be matched with a respective one of the primary local content entries 51 by comparing the name, address, geographic location, telephone number, and/or other unique identifier of the added and primary local content entries 32 and 51. There are usually more primary local content entries 51 than added local content entries 32, which means that only a subset of the primary local content entries 51 can be matched to the added local content entries 32. The added local content entries 32 include the added content that was entered and described with reference to FIG. 6, and the primary local content entries 51 do not include the added content. The added local content entries 32 also include a flag indication whether money is available in the corresponding account entry 78.

Figure 10:
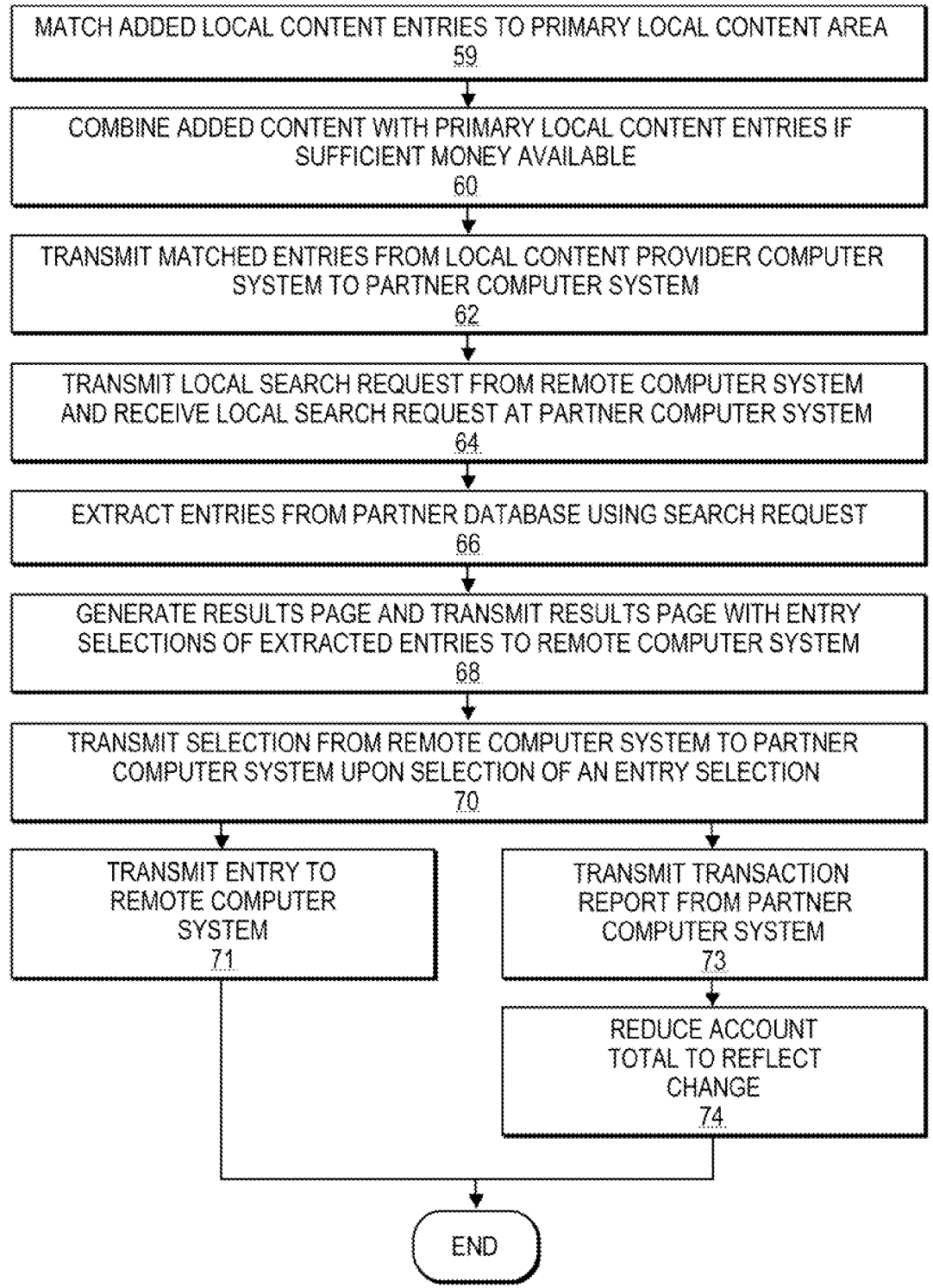
FIG. 10 is a flow chart illustrating the functioning of the components of FIG. 9.

FIG. 10 illustrates the functioning of the components illustrated in FIG. 9A. At Block 59, the business targeting module 48 matches each one of the added local content entries 32 to a respective one of the primary local content entries 51. At Block 60, the business targeting module 48 combines the added local content from each added local content entry 32 with data from a respective primary local content entry 51 to render a set of matched entries 53. What is important to note is that the added content is only included in the matched entries 53 from those added local entries 32 showing an account balance above a predetermined minimum, for example, $500 or $0. A complete set of entries after such matching includes all of the primary local content entries 51 with the added content from the added local content entries 32 matched to respective ones of the primary local content entries 51. At Block 62, the matched entries 53 are transmitted from the local content provider computer system 12 to the partner computer system 16. The data forwarding and updating module 50 has a feed preparation module 50A that prepares the matched entries 53 in a form acceptable for the partner database 54, and transmits all of the matched entries 53 to a partner computer system 16. The matched entries 53 are then stored on the partner database 54. The data forwarding and updating module 50 periodically and automatically updates the partner database 54, so that the partner database 54 is updated with new content that is created in the content database 30 as described with reference to FIG. 2.

A user at the remote computer system 18 can download a search page from the partner Web application system 56 and enter a local search request on the search page. At Block 64, the user transmits the local search request from the remote computer system 18 to the partner Web application system 56, and the partner Web application system 56 receives the local search request.

At Block 66, the partner Web application system 56 extracts a subset of the matched entries 53 from the partner database 54. The matched entries 53 that are extracted from the partner database 54 are geographically close to a location indicated by the local search request, e.g., within a radius of five miles. All matched entries 51 based on the search query are extracted, but only matched entries corresponding to added local content entries 32 flagged with "Y" that sufficient money is available indicate any added content originally from the added local content entries 32.

At Block 68, the partner Web application system 56 generates a results page and transmits the results page with entry selectors of the extracted entries to the remote computer system 18. The user at the remote computer system 18 can then select one of the entry selectors. At Block 70, the selection made at the remote computer system 18 is automatically transmitted from the remote computer system 18 to the partner Web application system 56 upon selection of one of the entry selections. At Block 71, the partner Web application system 56 automatically transmits the entry corresponding to the entry selection originally made at the remote computer system 18 to the remote computer system 18.

At Block 73, the data collection module 58 simultaneously and automatically transmits a transaction report from the partner computer system 16 to the local content provider computer system 12. In another embodiment, transaction reports can be collected by the data collection module 58 and be transmitted in a delayed feed, for example hourly or weekly. The transaction report includes an indication of the specific local content entry that has been selected at the remote computer system 18 and transmitted from the partner Web application system 56 to the remote computer system 18. The account reduction module 52 receives the transaction report and automatically updates the account total by reducing the account total of the account entry 26 corresponding to the added local content entry 32 selected at the remote computer system 18 by a predetermined amount.

It can thus be seen that an account entry 26 on the local content provider computer system 12 is charged due to a transaction that happens between the partner computer system 16 and the remote computer system 18. The account total can again be updated by replenishing the account total as hereinbefore described with reference to FIG. 2.

Figure 9B:
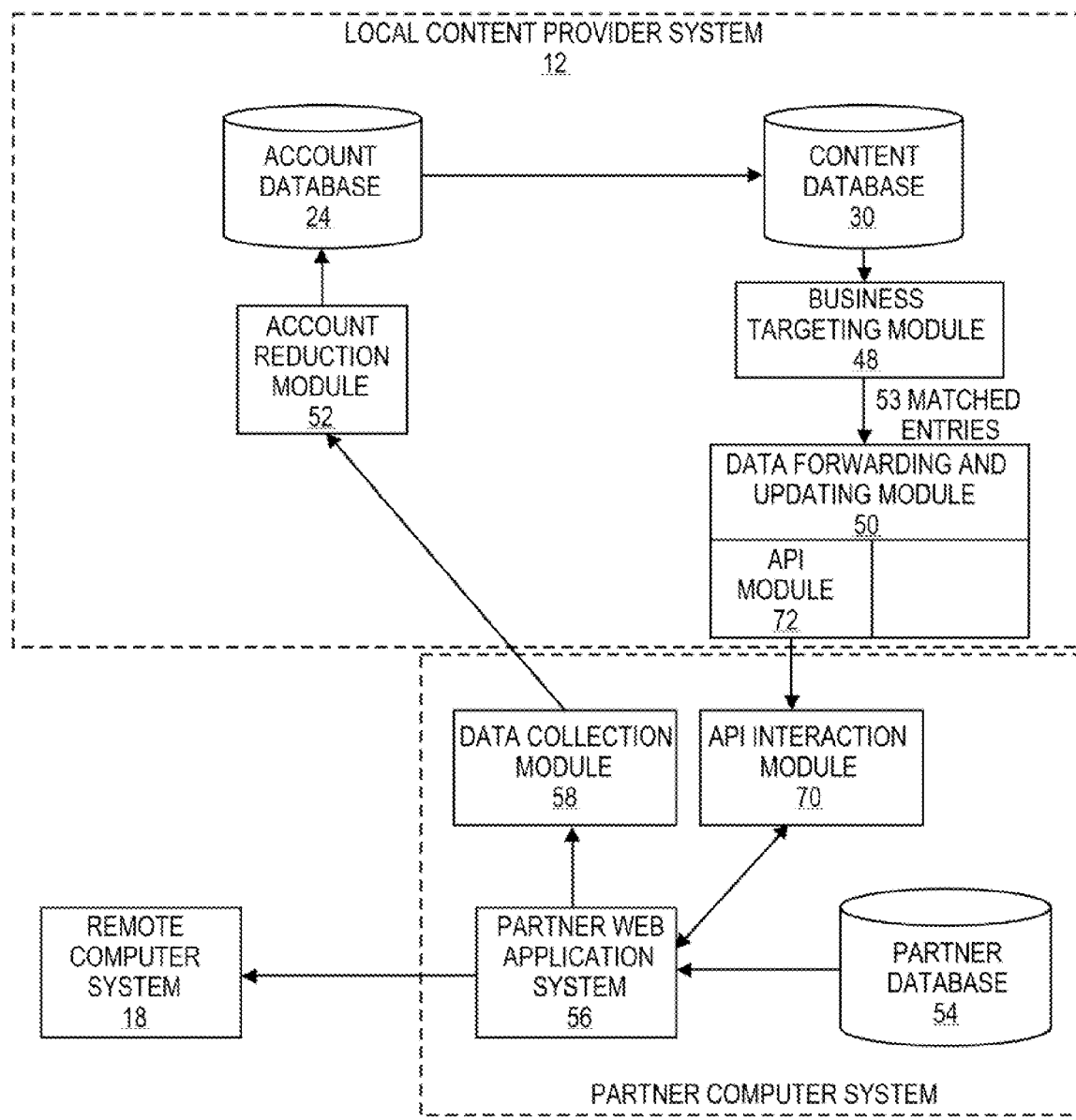

FIG. 9B shows an alternate embodiment wherein matched entries 53 are not stored on a partner database such as the partner database 54 in FIG. 16. Instead, the partner computer system 16 includes an application programming interface (API) interaction module 70 that provides an interface between an API module 72 of the data forwarding and updating module 50 forming part of the local content provider system 12. The API interaction module 70 connects and communicates with the API module 72 and passes matched entries 53 on to the partner web application system 56. The data collection module 58 records selections made at the remote computer system 18 in a manner similar to the data collection module 58 of FIG. 9A. The account reduction module 52 in FIG. 9B is updated in a similar manner to the account reduction module 52 in FIG. 9A.

Figure 9C:
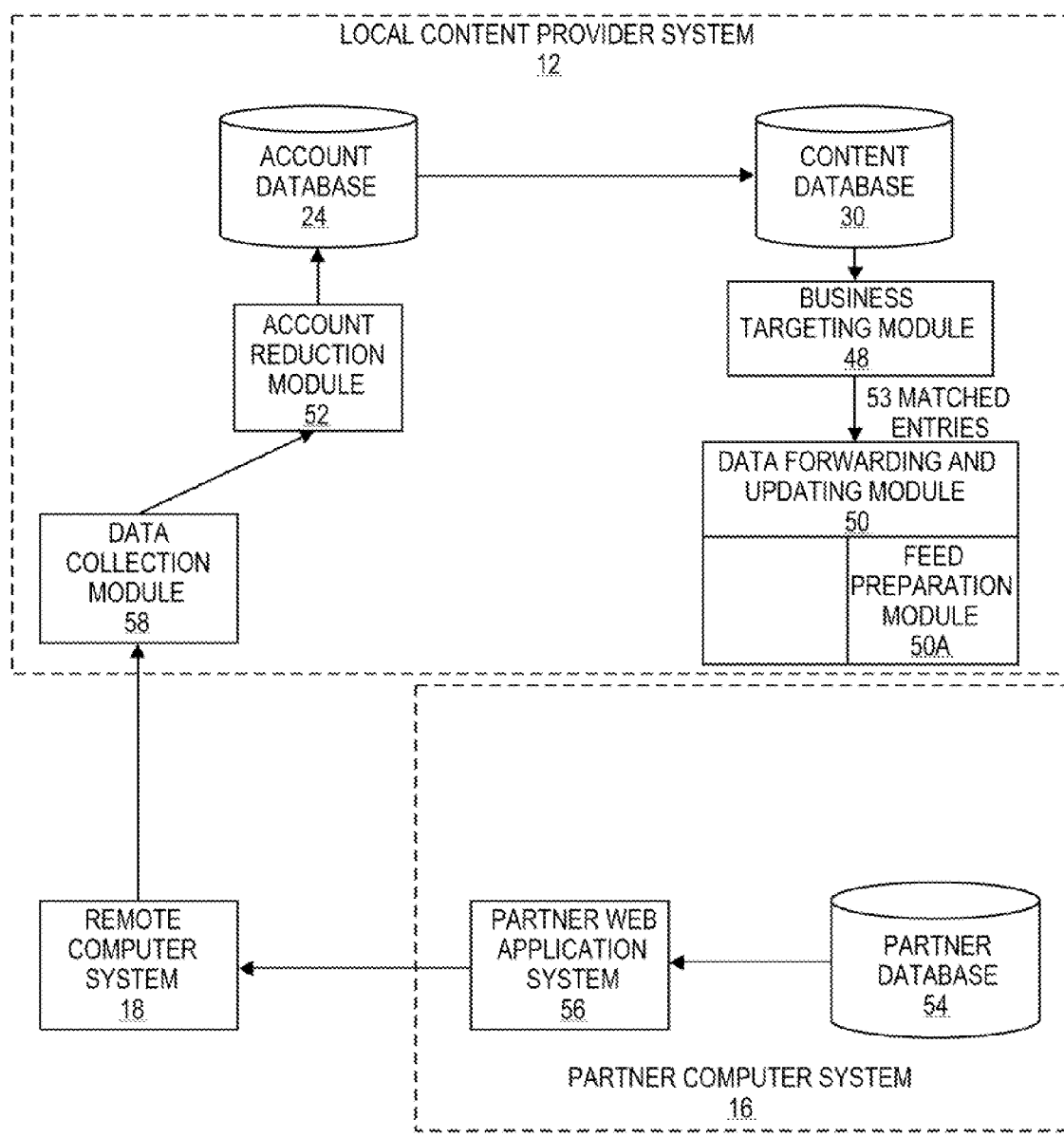

FIG. 9C illustrates another variation of FIG. 9A. In FIG. 9C, a data collection module 58 resides on the local content provider system 12 and no data collection module resides on the partner computer system 16. The remote computer system 18 provides a signal to the data collection module 58 when a selection is made as described with reference to FIGS. 11 and 12. The signal is automatically transmitted by a small application or "beacon" that downloads together with the page shown in FIG. 12. The "beacon" is associated with the page of FIG. 12 by the data forwarding and updating module 50. Each one of the matched entries 53 has its own "beacon" associated therewith that identifies the particular matched entry. The signal that is transmitted from the remote computer system 18 to the data collection module 58 by the "beacon" includes an identification of the particular matched entry 53. It is also possible to modify the embodiment of FIG. 9B by replacing the data collection module 58 in the partner computer system 16 with a data collection module (not shown) in the local content provider system 12, and providing "beacons" so that remote computer systems such as the remote computer system 18 report directly to the data collection module 58 the local content provider system 12.

Figure 11:
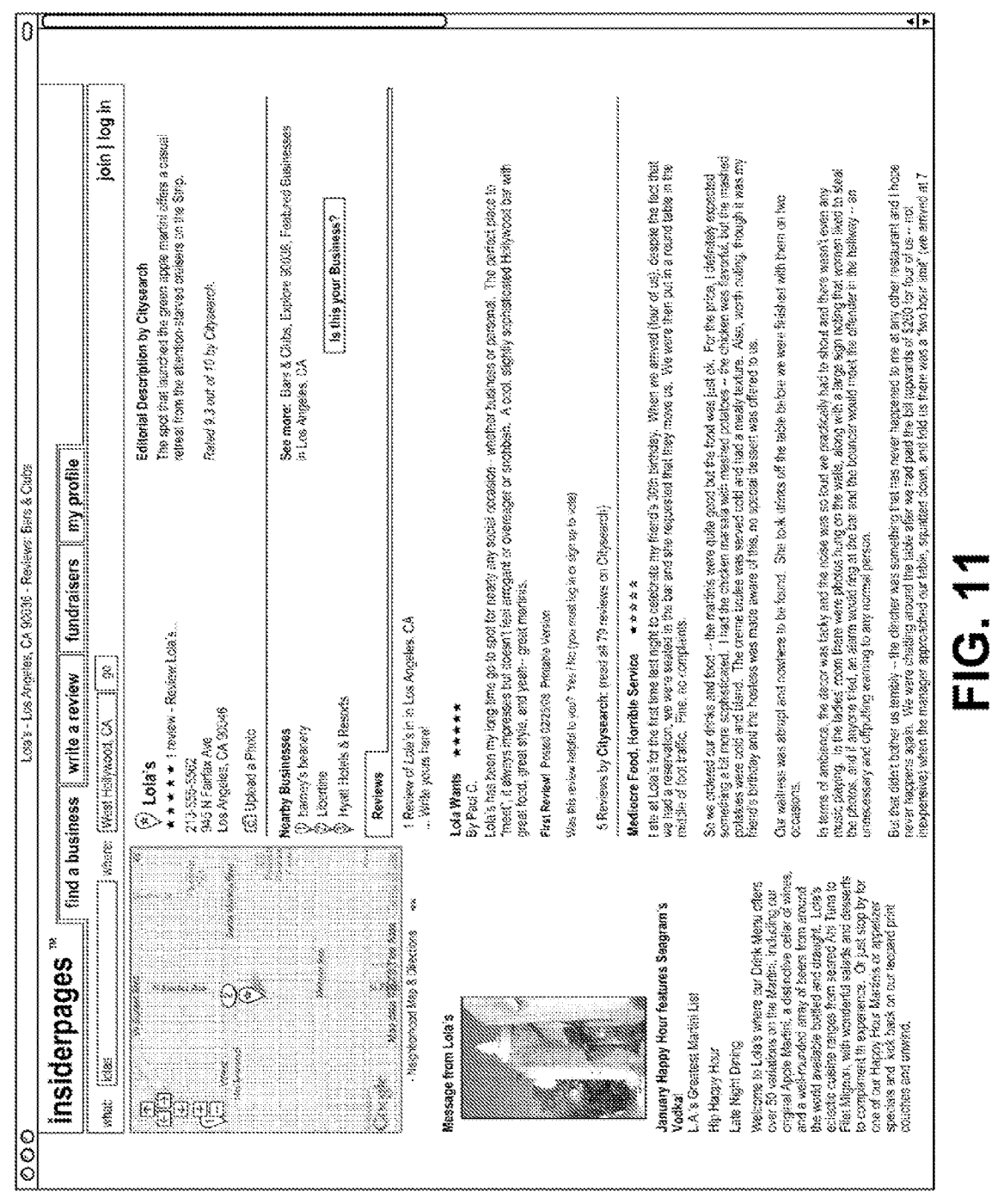

FIG. 11 illustrates a results page that is transmitted from the partner computer system 16 to the remote computer system 18, including a plurality of entry selections (e.g., "lolas"). The respective entry also includes added content from FIG. 6 and because sufficient funds are available as shown in the respective account entry 78 of FIG. 9A.

Figure 12:
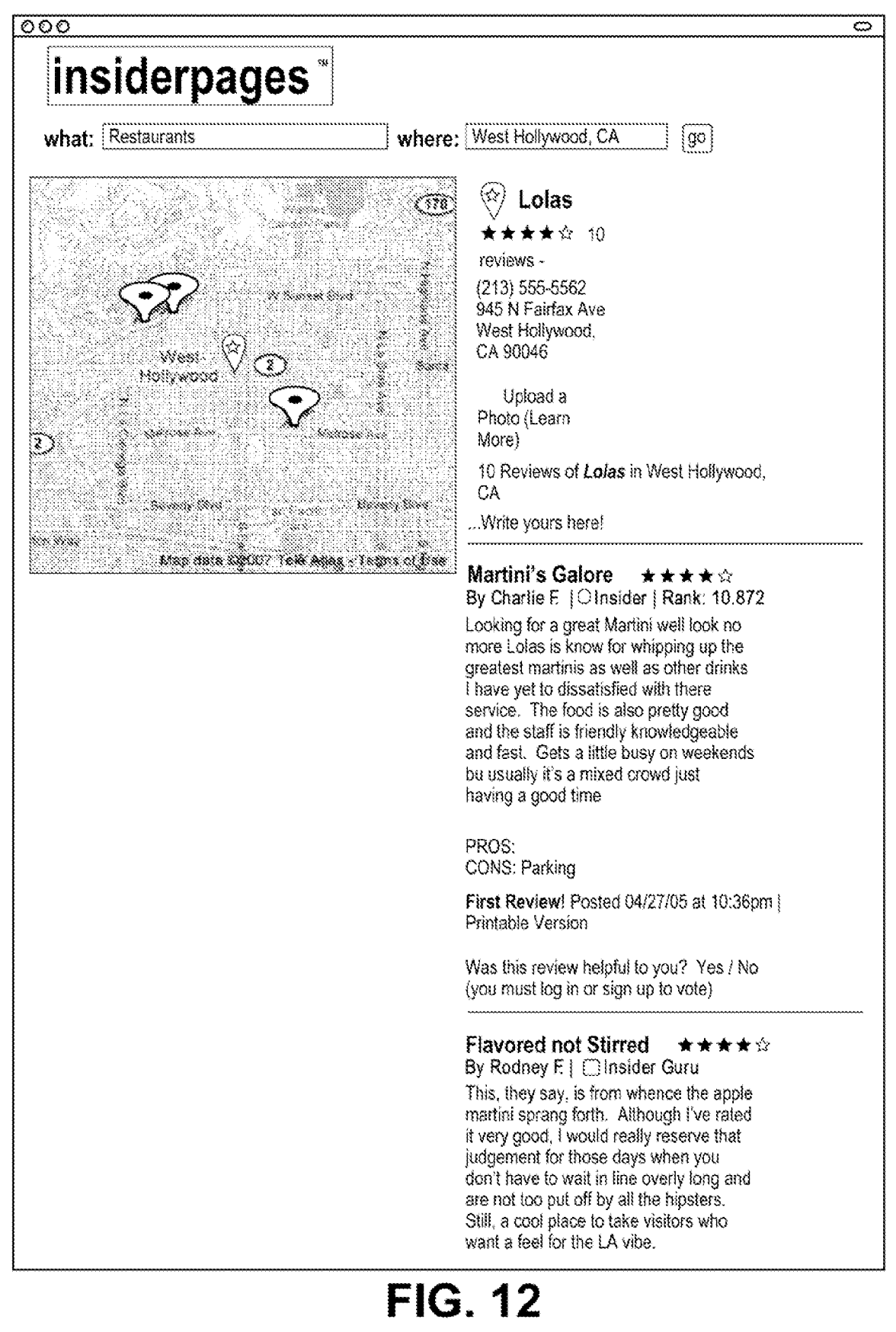

FIG. 12 is a view of the entry that is transmitted from the partner computer system 16 to the remote computer system 18 upon selection of one of the entry selections.

Figure 13:
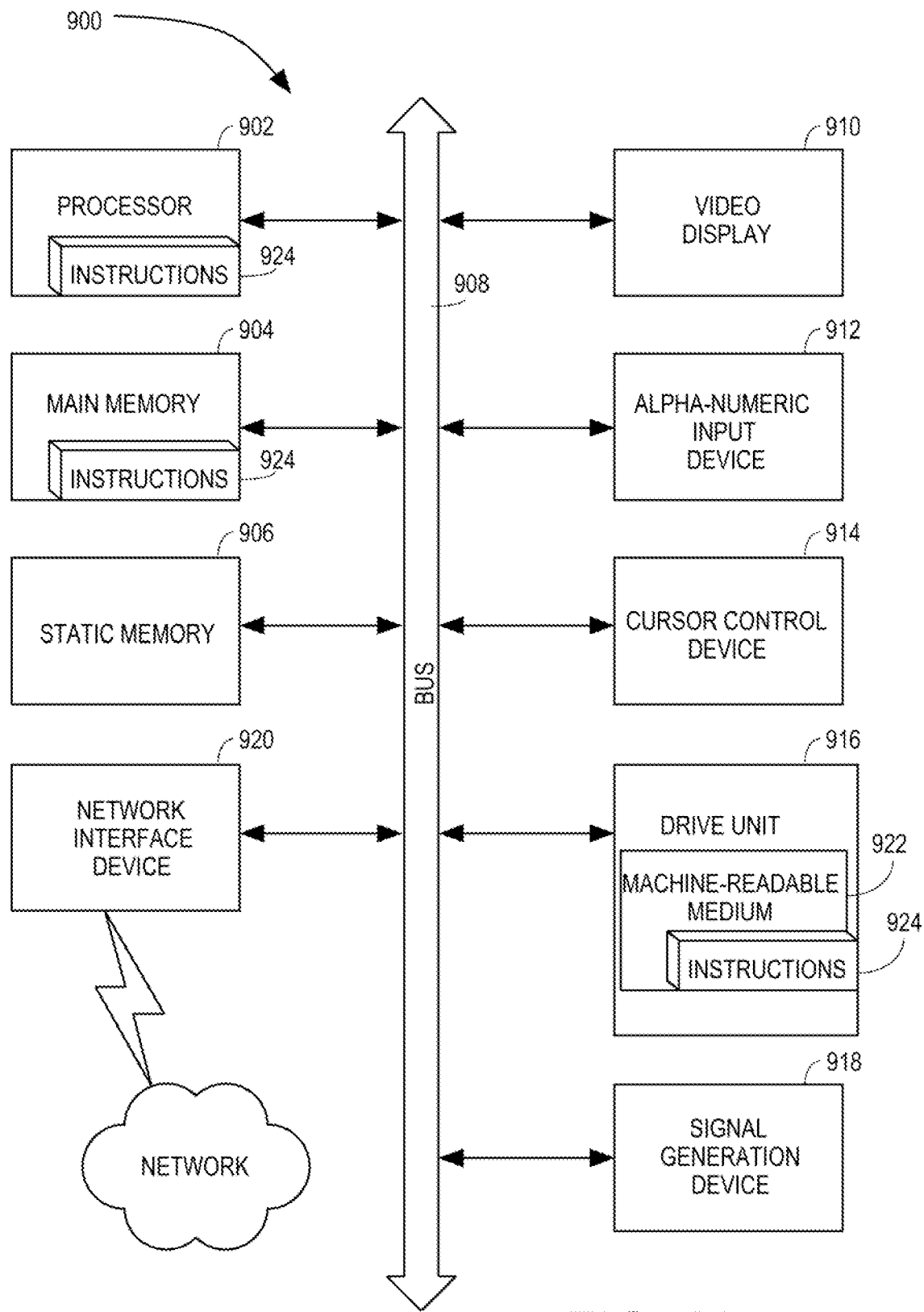
FIG. 13 is a block diagram of a machine in the form of a computer that can find application in the present invention system, in accordance with one embodiment of the invention.

FIG. 13 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.), and a static memory 906 (e.g., flash memory, static random access memory (SRAM), etc.), which communicate with each other via a bus 908.

The computer system 900 may further include a video display 910 (e.g., a liquid crystal display (LCD) or a cathode ray tube (CRT)). The computer system 900 also includes an alpha-numeric input device 912 (e.g., a keyboard), a cursor control device 914 (e.g., a mouse), a disk drive unit 916, a signal generation device 918 (e.g., a speaker), and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 928 via the network interface device 920.

While the computer-readable medium 924 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that cause the machine to perform any one or more of the methodologies of the present invention. The term "computer-readable medium" shall accordingly be taken to include, but not be limited to, solid-state memories and optical and magnetic media.

It should be understood that "computer system" as used herein can comprise a single computer or multiple computers that are connected to one another over a network.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of communicating local content over a network, comprising:
    storing a plurality of primary local content entries on a local content provider computer system;
    storing an account total for each of a plurality of customers;
    storing a plurality of added local content entries relating to the customers on a local content provider computer system;
    matching each added local content entry to a respective one of the primary local content entries;
    adding the added content to the primary local content entry when the account total is above a predetermined amount, to create the matched entries;
    transmitting at least a subset of the matched entries from the local content provider computer system over a network to a partner computer system, each matched entry that is transmitted including data from a respective one of the primary local content entries and added content from the respective added local content entry;
    wherein said transmitting further comprises:
        transmitting both the primary local content entry and the added local content entry when the account total corresponding to the respective local content entry is above a predetermined value;
        transmitting only the primary local content entry when the account total corresponding to the respective local content entry is below a predetermined value; and
    updating a selected account total of a selected customer for a charge based on a transaction at the partner computer system, the transaction involving extraction and transmission of a selected matched entry corresponding to the selected customer due to a search request received from a remote computer system at the partner computer system.

2. The method of claim 1, further comprising:
    storing the entries in a partner data store at the partner computer system;
    receiving a search request from the remote computer system at the partner computer system;
    extracting the selected entry from the partner data store based on the search request; and
    transmitting the selected entry from the partner computer system to the remote computer system.

3. The method of claim 2, further comprising:
    reporting the transaction by automatically transmitting a transaction report from the partner computer system to the local content provider system.

4. The method of claim 3, wherein the account total is automatically updated in response to the transaction report.

5. The method of claim 2, wherein a plurality of the entries is extracted from the partner data store, further comprising:
    transmitting a results page from the partner computer system to the remote computer system, the results page including a plurality of entry selectors corresponding to the entries that are extracted;
    receiving a selection from the remote computer system at the partner computer system following selection of one of the entry selectors at the remote computer system; and
    transmitting the entry corresponding to the entry selector selected at the remote computer system to the remote computer system.

6. The method of claim 1, wherein each entry includes at least a name, an address, a telephone number, and a geographical location.

7. The method of claim 6, further comprising:
    receiving contents for the entries from a plurality of customer computer systems.

8. The method of claim 7, further comprising:
    receiving an update of each account total from the customer computer systems upon payment.

9. The method of claim 7, further comprising:
    receiving enrollment information from each customer computer system prior to receiving the contents for each entry.

10. The method of claim 7, further comprising:
    generating the geographic location of each entry, utilizing the contents received from each respective customer computer system.

11. A computer-readable storage medium having stored thereon a set of instructions which, when executed by a processor of a computer, carries out a method comprising:
    storing a plurality of primary local content entries on a local content provider computer system;
    storing an account total for each of a plurality of customers;
    storing a plurality of added local content entries relating to the customers on a local content provider computer system;
    matching each added local content entry to a respective one of the primary local content entries;
    adding the added content to the primary local content entry when the account total is above a predetermined amount, to create the matched entries;
    transmitting at least a subset of the matched entries from the local content provider computer system over a network to a partner computer system, each matched entry that is transmitted including data from a respective one of the primary local content entries and added content from the respective added local content entry;
    wherein said transmitting further comprises:
        transmitting both the primary local content entry and the added local content entry when the account total corresponding to the respective local content entry is above a predetermined value;
        transmitting only the primary local content entry when the account total corresponding to the respective local content entry is below a predetermined value; and
    updating a selected account total of a selected customer for a charge based on a transaction at the partner computer system, the transaction involving extraction and transmission of a selected matched entry corresponding to the selected customer due to a search request received from a remote computer system at the partner computer system.

12. A communications system for communicating local content over a network, comprising:
- a local content provider computer system, including at least one local content provider data store;
- a plurality of primary local content entries stored in the at least one local content provider data store;
- an account total stored in the at least one local content provider data store for each of a plurality of customers;
- a plurality of added local content entries stored in the at least one local content provider data store for each one of the customers;
- a business targeting module that matches each added local content entry to a respective one of the primary local content entries and adds the added content to the primary local content entry when the account total is above a predetermined amount, to create the matched entries;
- a data-forwarding module for transmitting at least a subset of the matched entries from the local content provider computer system over a network to a partner computer system, each matched entry that is transmitted including data from a respective one of the primary local content entries and added content from the respective added local content entry;
- wherein said transmitting further comprises:
  - transmitting both the primary local content entry and the added local content entry when the account total corresponding to the respective local content entry is above a predetermined value;
  - transmitting only the primary local content entry when the account total corresponding to the respective local content entry is below a predetermined value; and
- an account reduction module that updates the total of a selected customer for a charge based on a transaction at the partner computer system, the transaction involving extraction and transmission of a selected matched entry corresponding to the elected customer due to a search request received from a remote computer system at the partner computer system.

13. The communications system of claim 12, further comprising:
- a reporting module on the partner computer system that reports the transaction by automatically transmitting a transaction report from the partner computer system to the local content provider system.

* * * * *